(12) United States Patent
Ni

(10) Patent No.: US 10,694,149 B2
(45) Date of Patent: Jun. 23, 2020

(54) WEB BASED SECURITY SYSTEM

(71) Applicant: Verizon Patent and Licensing Inc., Basking Ridge, NJ (US)

(72) Inventor: James J. Ni, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 294 days.

(21) Appl. No.: 13/850,517

(22) Filed: Mar. 26, 2013

(65) Prior Publication Data
US 2014/0293046 A1 Oct. 2, 2014

(51) Int. Cl.
*H04N 7/18* (2006.01)
*G08B 13/196* (2006.01)

(52) U.S. Cl.
CPC ....... *H04N 7/181* (2013.01); *G08B 13/19656* (2013.01)

(58) Field of Classification Search
CPC ........................................................ H04N 7/18
USPC .......................................................... 348/143
See application file for complete search history.

(56) References Cited

U.S. PATENT DOCUMENTS

| | | | | |
|---|---|---|---|---|
| 6,970,183 B1* | 11/2005 | Monroe | ................. | G08B 7/062 348/143 |
| 6,973,166 B1* | 12/2005 | Tsumpes | ............. | H04L 12/2854 379/37 |
| 6,975,220 B1* | 12/2005 | Foodman | ......... | G08B 13/19645 340/531 |
| 7,015,806 B2* | 3/2006 | Naidoo | ............ | G08B 13/19656 340/506 |
| 7,187,986 B2* | 3/2007 | Johnson | ................. | G05B 15/02 340/3.1 |
| 7,477,285 B1* | 1/2009 | Johnson | ........... | G08B 13/19602 348/143 |
| 8,098,281 B1* | 1/2012 | Croak | ............... | G08B 13/19669 348/143 |
| 8,644,702 B1* | 2/2014 | Kalajan | ............ | H04N 21/64784 396/429 |

(Continued)

FOREIGN PATENT DOCUMENTS

| | | | | |
|---|---|---|---|---|
| EP | 2947825 A1 * | 11/2015 | ......... | H04N 21/4325 |
| WO | WO-2007011205 A1 * | 1/2007 | ........... | G08B 15/002 |

(Continued)

OTHER PUBLICATIONS

Web Real-Time Communication (WebRTC): Media Transport and Use of RTP from the RTCWeb Working Group (Year: 2015).*

(Continued)

*Primary Examiner* — Richard A Hansell, Jr.

(57) ABSTRACT

A web server may receive, from a controlling device, an internet based call that includes a video feed of a surveillance premises in response to a detected triggering event. The web server may also receive an identifier for a user account associated with the surveillance premises. The web server may determine a user preference for alerts based on the identifier for the user account, and send an alert notification that includes an Internet based link to the video feed based on the determined user preference for alerts. The web server may provide a web page that includes the video feed to at least one device associated with the user account. The web server may deliver the call directly to at least one device associated with the user account.

21 Claims, 10 Drawing Sheets

(56) References Cited

U.S. PATENT DOCUMENTS

| | | | | |
|---|---|---|---|---|
| 8,914,526 B1* | 12/2014 | Lindquist | | H04L 29/06 |
| | | | | 709/229 |
| 9,178,998 B2* | 11/2015 | O'Connor | | H04M 3/5175 |
| 2003/0025599 A1* | 2/2003 | Monroe | | G08B 13/19602 |
| | | | | 340/531 |
| 2004/0086093 A1* | 5/2004 | Schranz | | H04L 12/1895 |
| | | | | 379/37 |
| 2004/0215694 A1* | 10/2004 | Podolsky | | H04L 12/2803 |
| | | | | 709/201 |
| 2007/0262857 A1* | 11/2007 | Jackson | | G08B 13/19656 |
| | | | | 340/506 |
| 2008/0303903 A1* | 12/2008 | Bentley | | G08B 13/19606 |
| | | | | 348/143 |
| 2009/0265747 A1* | 10/2009 | Li | | G06F 21/10 |
| | | | | 725/109 |
| 2010/0195810 A1* | 8/2010 | Mota | | H04N 7/186 |
| | | | | 379/167.12 |
| 2013/0107041 A1* | 5/2013 | Norem | | H04N 5/225 |
| | | | | 348/143 |
| 2014/0126714 A1* | 5/2014 | Sayko | | H04M 3/5191 |
| | | | | 379/265.09 |
| 2014/0232861 A1* | 8/2014 | Naidoo | | H04N 7/18 |
| | | | | 348/143 |
| 2014/0270104 A1* | 9/2014 | O'Connor | | H04M 3/5175 |
| | | | | 379/85 |
| 2014/0368601 A1* | 12/2014 | deCharms | | H04W 4/021 |
| | | | | 348/14.02 |
| 2015/0350723 A1* | 12/2015 | He | | H04L 12/6418 |
| | | | | 725/82 |

FOREIGN PATENT DOCUMENTS

| | | | | |
|---|---|---|---|---|
| WO | WO 2009023647 A1 * | 2/2009 | | G08B 25/009 |
| WO | WO-2009023647 A1 * | 2/2009 | | H04L 12/66 |

OTHER PUBLICATIONS

Regarding ITU-T H.323 see https://www.itu.int/rec/t-rec-h.323 (Year: 2006).*

* cited by examiner

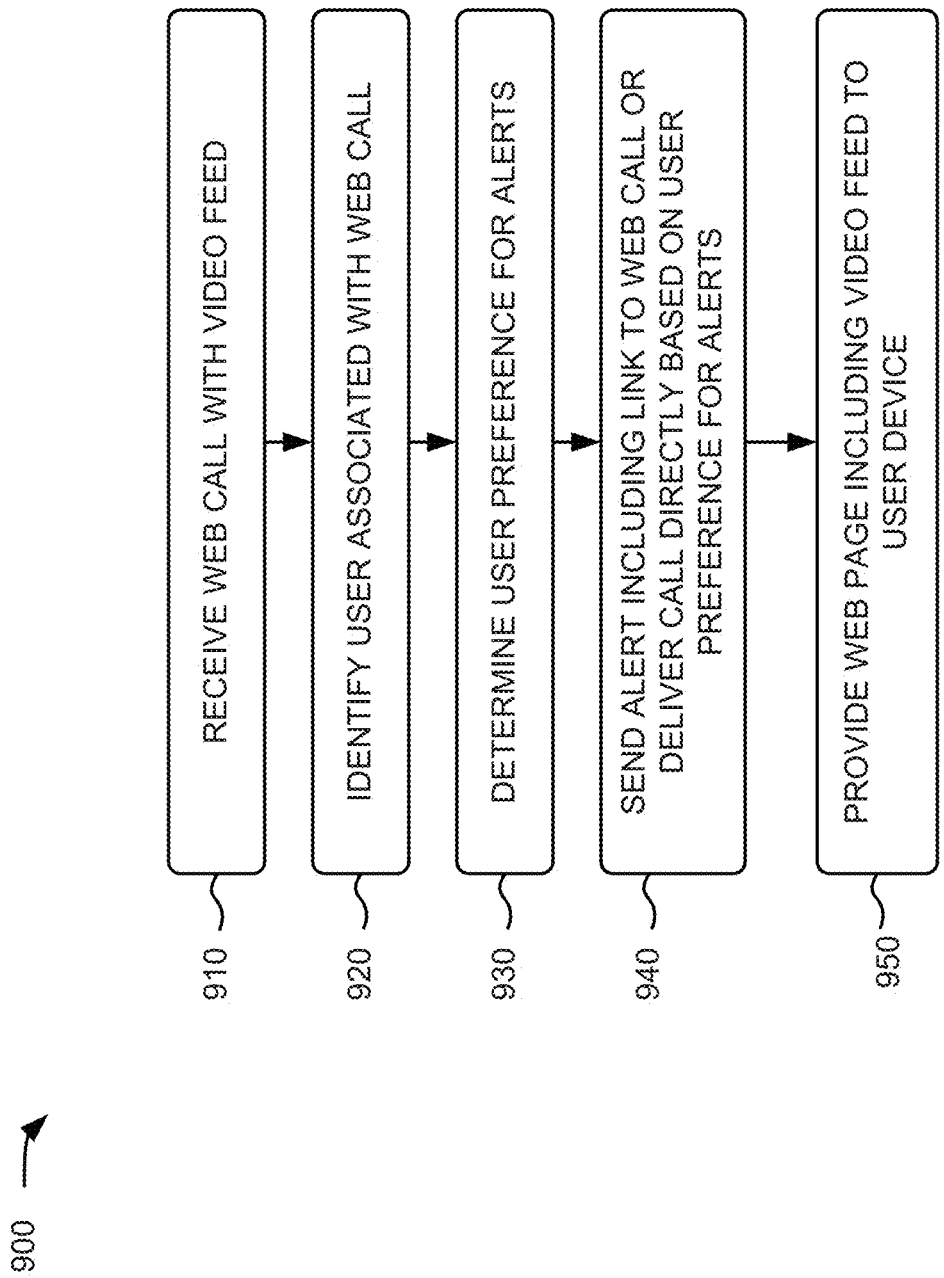

WEB BASED SECURITY SYSTEM

BACKGROUND

Security systems provide surveillance, alarm and deterrence capabilities to protect homes and/or businesses. Most security systems include different devices, such as electrical devices (e.g., light switches, etc.), video surveillance systems (e.g., digital video cameras), and communication systems (e.g., an alarm system, etc.). The security systems are often monitored by a third party security service provider from an off-site location.

BRIEF DESCRIPTION OF THE DRAWINGS

FIG. 9 is a flow chart of another exemplary process for providing security management via a web browser according to implementations described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a real time, web based monitor and surveillance system. For example, the systems and/or methods may provide a web real time communication (webRTC) based monitor and surveillance solution that may be used for home security, after-hours office/building/store monitoring, and similar applications. The systems may be implemented based on a combination of real time on-demand voice and video call capability, web based functionality, wireless and/or wire line network infrastructures. The systems may provide monitoring and surveillance capabilities to multiple users associated with a home, business, home security management company and/or government police, fire and emergency handling departments simultaneously based on Internet availability by various types and/or combinations of devices (such as private or public computers, tablets, smartphones etc., which have network access).

As used herein, the term "security control application" may refer to an application that may receive and respond to user input (e.g., via a mobile device) that implements security monitoring and deterrence.

Figure 1:
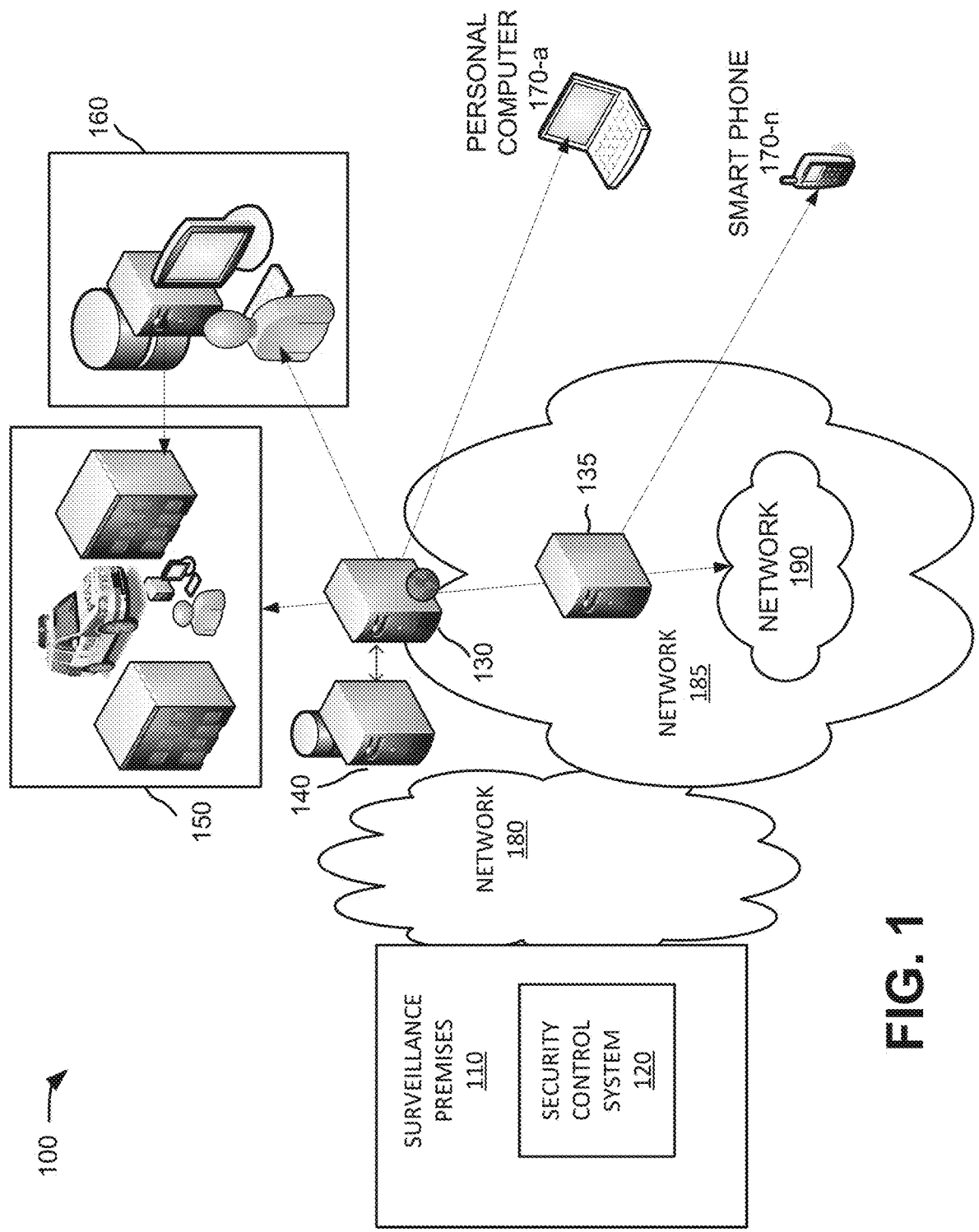
FIG. 1 is a diagram of an exemplary network in which systems and/or methods described herein may be implemented.

FIG. 1 is a diagram of an exemplary environment 100 in which systems and/or methods described herein may be implemented. As illustrated, environment 100 may include a surveillance premises 110, a security control system 120, a web server 130, a webRTC gateway 135, a backend server 140, an emergency services system 150, a security management system 160, and user devices 170a-170n (collectively referred to as user devices 170 or individually as user device 170) interconnected by networks 180/185/190. Components of environment 100 may interconnect via wired and/or wireless connections. One surveillance premises 110, one security control system 120, one web server 130, one webRTC gateway 135, one backend server 140, one emergency services system 150, one security management system 160, two user devices 170 and three networks 180/185/190 have been illustrated in FIG. 1 for simplicity. In practice, there may be more surveillance premises 110, security control systems 120, web servers 130, webRTC gateways 135, backend servers 140, emergency services systems 150, security management systems 160, user devices 170 and networks 180/185/190. Also, in some instances, one or more of the components of environment 100 may perform one or more functions described as being performed by another one or more of the components of environment 100.

Surveillance premises 110 may include an area that a user designates to be monitored such as described below with respect to FIG. 3. Surveillance premises 110 may include buildings, such as a home, business or community center, etc. Surveillance premises 110 may contain devices capable of providing information associated with surveillance premises 110 (or another area to be controlled), any device (e.g., provided in a home or another area) that is capable of being controlled, etc. For example, surveillance premises 110 may include devices provided to directly perform security monitoring and/or response functions, devices that have other primary functions and provide security capabilities, etc. Surveillance premises 110 may include electrical systems (e.g., light switches, lights, etc.), mechanical systems (e.g., windows, blinds, doors, door locks, etc.), communication systems (e.g., security system devices, surveillance cameras, LAN devices, routers, modems, etc.), etc.

Security control system 120 may implement security services, including surveillance, alarm, response and deterrence functions, etc., for surveillance premises 110 using a web based system, such as Web real time communication (webRTC), a technology standard defined by the World Wide Web Consortium (W3C). WebRTC may enable browser to browser applications, such as video chat, voice calling, and peer to peer (P2P) file sharing that may be used to implement security functions associated with security control system 120 as described herein with respect to FIG. 4. Security control system 120 may include one or more computing devices, or other types of computation or communication devices, that provide monitoring and surveillance capabilities based on webRTC for home security, after-hour office/building/store monitoring, etc. Security control system 120 may include real time on-demand voice and video call capability; additional Internet based capabilities and functions, wireless and/or wire line network infrastructures. Security control system 120 may provide access to home security monitoring to multiple members of the home, home security management company and/or government police, fire and emergency handling departments based on predefined instructions as described below with respect to FIG. 4.

Web server 130 may include a webRTC enabled web server that supports webRTC applications. Web server 130 may be operated by a service provider, a home owner or enterprise owner, a security/surveillance company, etc. Web server 130 may deliver web pages that clients may use to control surveillance and security. Web server 130 may be implemented in conjunction with security control system 120 to provide monitoring, alarm, deterrence and surveillance capabilities. Web server 130 may host a website. Web server 130 may handle a transaction (e.g., a request to control a device associated with an account of a user, cameras, etc.) initiated at user device 170, emergency services system 150, or security management system 160.

WebRTC gateway server 135 may include a webRTC signaling gateway that provides signaling and/or media interworking/transcoding required to interwork a webRTC call with traditional telephony or mobile network service in instances in which devices (e.g., a smart phone) access security services.

Backend server 140 may include one or more server devices, or other types of computation or communication devices, that gather, process, search, and/or provide information in a manner described herein. Backend server 140 may provide various internet services, including allowing services provided by web server 130 accessible to security control system 120 and all user receiving terminals, such as user device 170, emergency services system 150, or security management system 160. In one implementation, backend server 140 may provide configuration information to user receiving terminals to enable user receiving terminals to implement security monitoring and services.

Emergency services system 150 may interface with web server 130 to communicate security information with security control system 120. Emergency services system 150 may be a part of a system associated with a police station, fire station, hospital, etc., and may provide notifications to emergency services personnel in response to alerts provided by security control system 120, Security management system 160 may interface with web server 130 to communicate security information with security control system 120. Security management system 160 may be a part of a system associated with a security provider. Security management system 160 may provide a capability for personnel associated with the security provider to monitor surveillance premises 110 via security control system 120 and to access additional capabilities associated with security control system 120.

Networks 180/185/190 may include a LAN, a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks. Devices using networks 180/185/190 may be connected via wired (e.g., Ethernet, coaxial cable, etc.) or wireless connections (e.g., using network devices such as those available under the IEEE 802.11 wireless LAN standards). Network 180 may be an access network for surveillance premises 110 (such as FiOS, Cable, digital subscriber line (DSL), Wi-Fi, WiMAX, 3G/LTE wireless etc., while network 185 may a backbone core network, such as the Internet. Networks 180/185/190 may include delivery network infrastructures that support webRTC applications. Network 190 may include a PSTN or public land mobile network (PLMN) signaling network (e.g., signaling system number 7 (SS7) or IMS) that a webRTC service may interwork in instances in which devices access security services via a telephone network.

Although FIG. 1 shows exemplary components of environment 100, in other implementations, environment 100 may contain fewer components, different components, differently arranged components, or additional components than depicted in FIG. 1.

Figure 2:
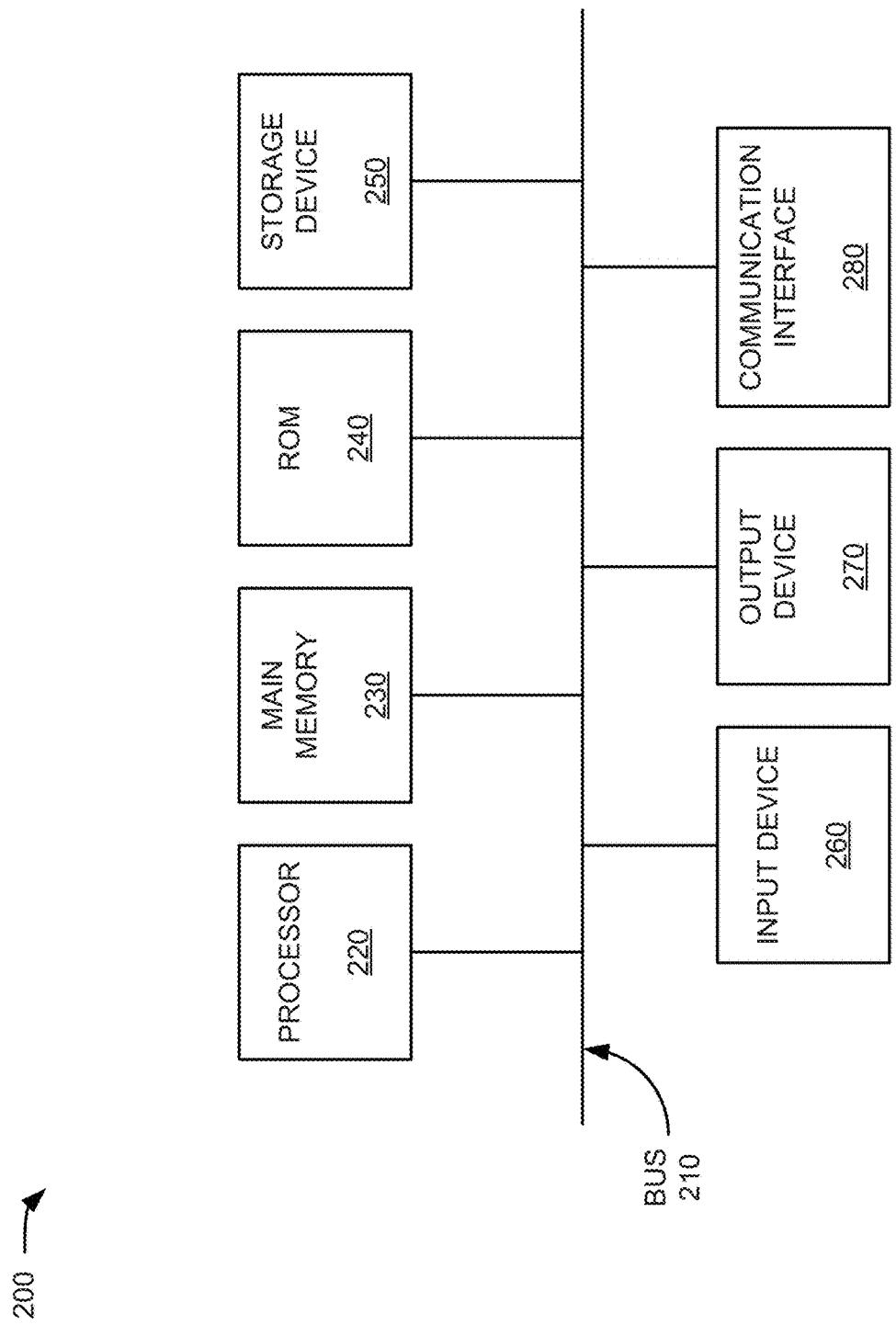
FIG. 2 is a diagram of exemplary components of one or more devices of the network depicted in FIG. 1.

FIG. 2 is a diagram of exemplary components of a device 200 that may correspond to one or more devices of network 100, such as STB 120, control point 130, backend server 140, or service provider 170. As illustrated, device 200 may include a bus 210, a processor 220, a main memory 230, a read-only memory (ROM) 240, a storage device 250, an input device 260, an output device 270, and a communication interface 280. Bus 210 may include a path that permits communication among the components of device 200.

Processor 220 may include one or more processors, microprocessors, or other types of processing units that may interpret and execute instructions. Main memory 230 may include a random access memory (RAM) or another type of dynamic storage device that may store information and instructions for execution by processor 220. ROM 240 may include a ROM device or another type of static storage device that may store static information and/or instructions for use by processor 220. Storage device 250 may include a magnetic and/or optical recording medium and its corresponding drive.

Input device 260 may include a mechanism that permits an operator to input information to device 200, such as remote control 140, control buttons, a keyboard, a mouse, a pen, a microphone, voice recognition and/or biometric mechanisms, a touch screen, etc. Output device 270 may include a mechanism that outputs information to the operator, including a display, an indicator light, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processor 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. In still other implementations, one or more components of device 200 may perform one or more other tasks described as being performed by one or more other components of device 200.

Figure 3:
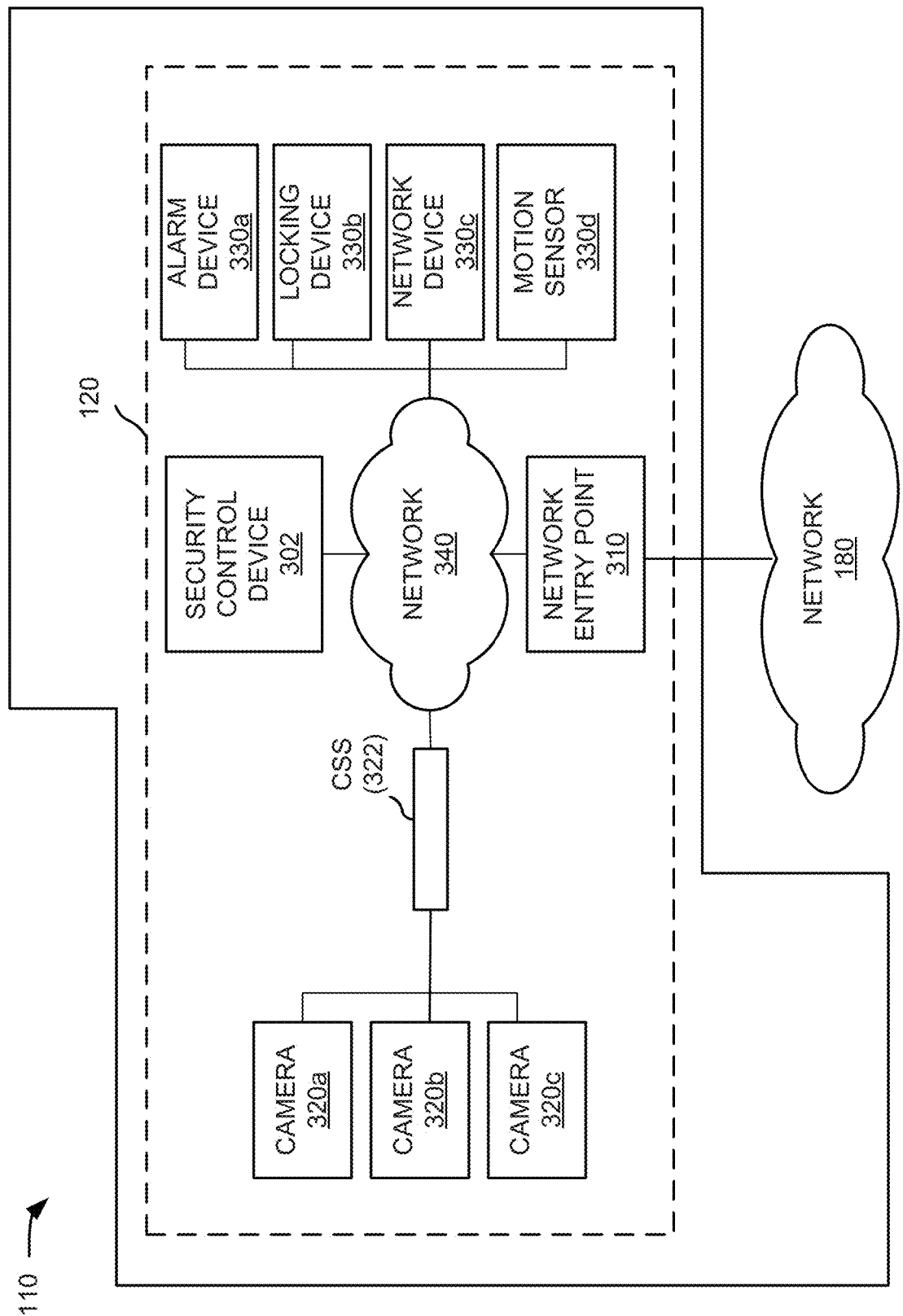
FIG. 3 depicts exemplary components of the surveillance premises depicted in FIG. 1.

FIG. 3 depicts exemplary functional components of security control system 120 installed at surveillance premises 110. As shown, security control system 120 may include a security control device 302, a network entry point 310, cameras 320a-320c (collectively referred to as cameras 320 or individually as camera 320), camera sampling switch (CSS) 322, and security support devices 330, such as alarm device 330a, locking device 330b, network device 330c and motion sensor 330d. Although particular components and devices installed at surveillance premises 110 are shown in FIG. 3, in practice, there may be more network entry points 310, cameras 310, CSSs 322, and security support devices 330 as well as different devices or components. Also, in some instances, one or more of the components installed at surveillance premises 110 may perform one or more functions described as being performed by another one or more of the components installed at surveillance premises 110.

Surveillance premises 110 may include a home, business, etc., which contains persons, things, etc. that the user wants to protect. Surveillance premises 110 may include the interior of a building, an external perimeter of a building and/or an open area.

Security control device 302 may control devices and components installed in surveillance premises 110 to implement security services in surveillance premises 110 as described with respect to FIG. 4 herein below. Security control device 302 may include one or more devices, such as a personal computer, which receives information and controls devices and components of security control system 120 and provides access to security services capabilities to external client devices via associated networks such as networks 180/185/190. Security control device 302 may include a personal computer running a webRTC capable browser and machine-readable instructions for detecting changes in a video feed (i.e., scene change detection software). Security control device 302 may monitor continuous feeds from multiple cameras 320 or may sample multiple video feeds, based on CSS 322.

In one implementation, security control device 302 may be implemented using multiple devices that include redundant hardware that may be located in separate locations with one or more independent power sources. Security control device 302 may include a power sensor that provides an indication in instances in which security control device 302 is not currently receiving power from a main power supply.

Network entry point 310 may connect external devices (e.g., emergency services system 150, security management system 160, user device 170, etc.) through the Internet via networks 180/185/190 to security control device 302 and devices within security control system 120. Security control device 302 may send messages to external devices via network entry point 310.

Cameras 320 may include dedicated embedded internal or non-embedded external web-cameras (webcams). Cameras 320 may include digital cameras, infra-red cameras, etc. Cameras 320 may be positioned at surveillance positions. The user may install cameras 320 in desired locations in her/her home (e.g. living room, family room, bedroom etc.). Cameras 320 may be stationary cameras or may include associated servomotors that allow a degree of motion in viewing an area under surveillance.

Camera 320 may be a video camera, such as an Internet protocol (IP) camera, which may send and receive data via network 340. In one implementation, the IP camera may include built-in recording functionality to capture/store video. Camera 320 may be managed by another device, such as CSS 322 or security control device 302, to control video recordings, notifications, etc. Camera 320 may generate video in one or more particular formats, such MPEG-4.

CSS 322 may include a webcam audio/video sampling switch that switches the audio/video input source of security control device 302 from one camera 320 to another periodically based on appropriate configuration allowing a single security control device 302 to monitor multiple locations.

Security support devices 330 may include devices that provide support for implementing security services. Security support devices 330 may include dedicated security devices, such as alarm device 330a, locking device 330b, motion sensors 330d, trip sensors (not shown), etc. Security support devices 330 may also include devices that provide an additional primary or secondary function, such as network device 330c, a lighting system (not shown), etc. Security support devices 330 may include lights, doors, locks, etc., which may be activated by a combination of electrical systems and mechanical systems controlled by security control device 302.

Network 340 may provide a connection between components of security control system 120. Network 340 may include connections from security control device 302 to cameras 320, CSS 322 and/or security support devices 330. Network 340 may also include a connection from the CSS 322 to cameras 320. The connections may be wireless connections (e.g. Wi-Fi, Bluetooth, Infrared, etc.) and/or wire line connections (e.g. Ethernet, optical fiber, universal serial bus (USB), recommended standard (RS)-323 port, etc.).

Figure 4:
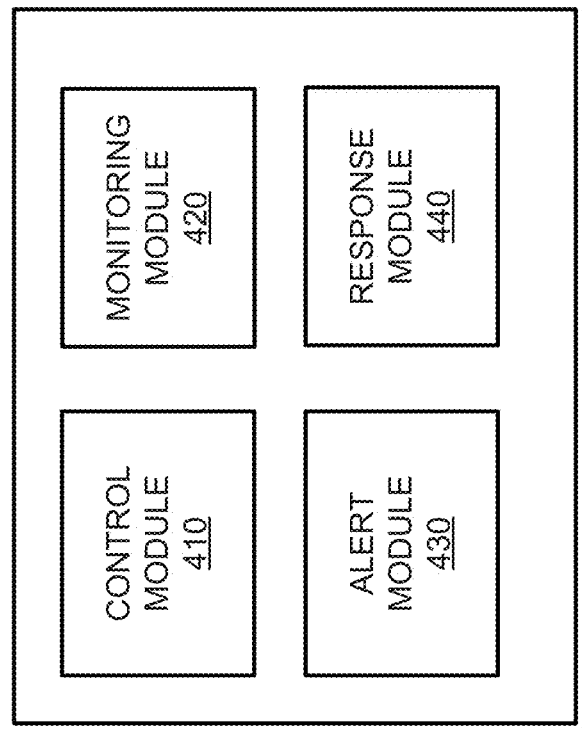
FIG. 4 is a functional block diagram of the security control system of FIG. 1.

Security control system 120 may include devices and machine-readable instructions that may be installed in surveillance premises 110 to implement security services, including surveillance, deterrence and response functions. Security control system 120 may receive control and predetermined instructions via security control device 302. Security control device 302 may be pre-programmed and/or controlled via Internet access (e.g., a web call from external devices associated with the user, emergency services providers, or a security services company) to perform security monitoring and response measures in surveillance premises 110 such as described with respect to FIG. 4:

FIG. 4 is a diagram of exemplary functional components of security control device 302. In one implementation, the functions described in connection with FIG. 4 may be performed by one or more components of device 200 (FIG. 2). As shown in FIG. 4, security control device 302 may include a control module 410, a monitoring module 420, an alert module 430, and a response module 440.

Control module 410 may receive user input that provides settings for security services that are to be implemented by security control device 302 in surveillance premises 110. The settings may include a schedule during which different types of surveillance are to be performed in surveillance premises 110 (e.g., a weekend or holiday monitoring schedule for a school building). Control module 410 may receive input that designates different zones (or portions) of surveillance premises 110 that are to be monitored, such as particular rooms, a perimeter of surveillance premises 110, etc. Control module 410 may include configuration and control software running in the control computer that provisions and controls cameras 320, CSS 322 and support devices 330.

Monitoring module 420 may monitor surveillance premises 110 to detect a triggering event (which may indicate a presence of a person) in surveillance premises 110 or a portion of surveillance premises 110. Monitoring module 420 may detect a triggering event in surveillance premises 110 based on analysis of information received from cameras 320 and additional sensors, such as motion sensors 330d, trip sensors (not shown) associated with particular entrances, etc. For example, monitoring module 420 may receive a video feed from cameras 320 and other monitoring information from the security support devices 330. Monitoring module 420 may perform scene change detection on the video feed to determine a triggering event (i.e., movement may indicate presence of a person in surveillance premises 110). Monitoring module 420 may also include machine-readable instructions that indicate a triggering event based on signals or analysis of information received from motion sensors 330*d* or other devices in surveillance premises 110.

According to one implementation, monitoring module 420 may include facial recognition technology. Monitoring module 420 may identify individual persons associated or not associated with surveillance premises 110 based on the facial recognition technology and determine triggering events accordingly. For example, monitoring module 420 may determine a triggering event based on a threshold number of persons detected in surveillance premises 110. Monitoring module 420 may also identify a zone of surveillance premises 110, and a time at which is the zone is to be monitored.

Alert module 430 may provide an alert to a predetermined group of devices in response to detection of a triggering event (i.e., unauthorized access to surveillance premises 110). The alert may be sent via email, short message, social network and/or other types of online application notifications to the user and any specified members authorized by the user (e.g., family members, friends, designated security management company or police/fire/emergency departments, etc.) to receive such notifications. The notification may contain a short event description, a recommended action and a link to receive the webRTC call initiated by alert module 430. Additionally, or alternatively, alert module 430 may convert and/or transcode signals (e.g., still image and/or video signals) from cameras 320 and additional sensors to enable presentation in web browsers of user devices 170.

According to one embodiment, security control system 120 may be placed into an armed status in which the system monitors for unauthorized access or an unarmed status. Alert module 430 may determine unauthorized access based on a current status (i.e., armed, disarmed, etc.) of security control system 120 and a detected triggering event in surveillance premises 110. Alert module 430 may send an alert (i.e., via networks 180/185/190 and web server 130) to external devices that monitor surveillance premises 110, such as emergency services system 150, security management system 160 and user device 170. Alert module 430 may send an alert to external devices via webRTC gateway server 135 that may include signal interworking with SS7 or IMS.

According to another implementation, alert module 430 may provide alerts based on a predetermined hierarchy of alerts. The predetermined hierarchy of alerts may include different types of triggering events (i.e., a type of intrusion detected) that are determined based on an area of surveillance premises 110 and a detected response of a detected person after a warning (e.g., from response module 440) has been provided (e.g., whether the detected person retreats or continues towards surveillance premises 110). Alert module 430 may provide a lower level warning for daytime incursions within an outer perimeter of surveillance premises 110 (e.g., when individuals enter a front yard of surveillance premises 110). In a further implementation, alert module 430 may provide alerts to different devices based on a hierarchy of users. For example, alert module 430 may provide alerts to a primary group that includes a main user, and to a designated secondary group that includes secondary users (e.g., parents of a main user), for example, in instances in which a response is not received from the primary group after a predetermined time.

Response module 440 may determine a response to an intrusion within the surveillance premises 110. Response module 440 may determine the response based on predetermined instructions or response module 440 may implement instructions received in real time from user devices 170, emergency services system 150 or security management system 160. For example, response module 440 may start an alarm device, provide a prerecorded warning, and/or manipulate lights in surveillance premises 110 based on the predetermined instructions. Response module 440 may receive a webRTC call required to invoke services, features, and/or applications associated with security control device 302 based on networking services provided via networks 180/185/190 corresponding to user devices 170, emergency services system 150 or security management system 160 (e.g., conferencing, call forwarding etc., in PSTN or IP telephony or PLMN networks). This may allow users to view video feeds and to control security operations via security control device 302, such as described below with respect to FIG. 5.

Figure 5:
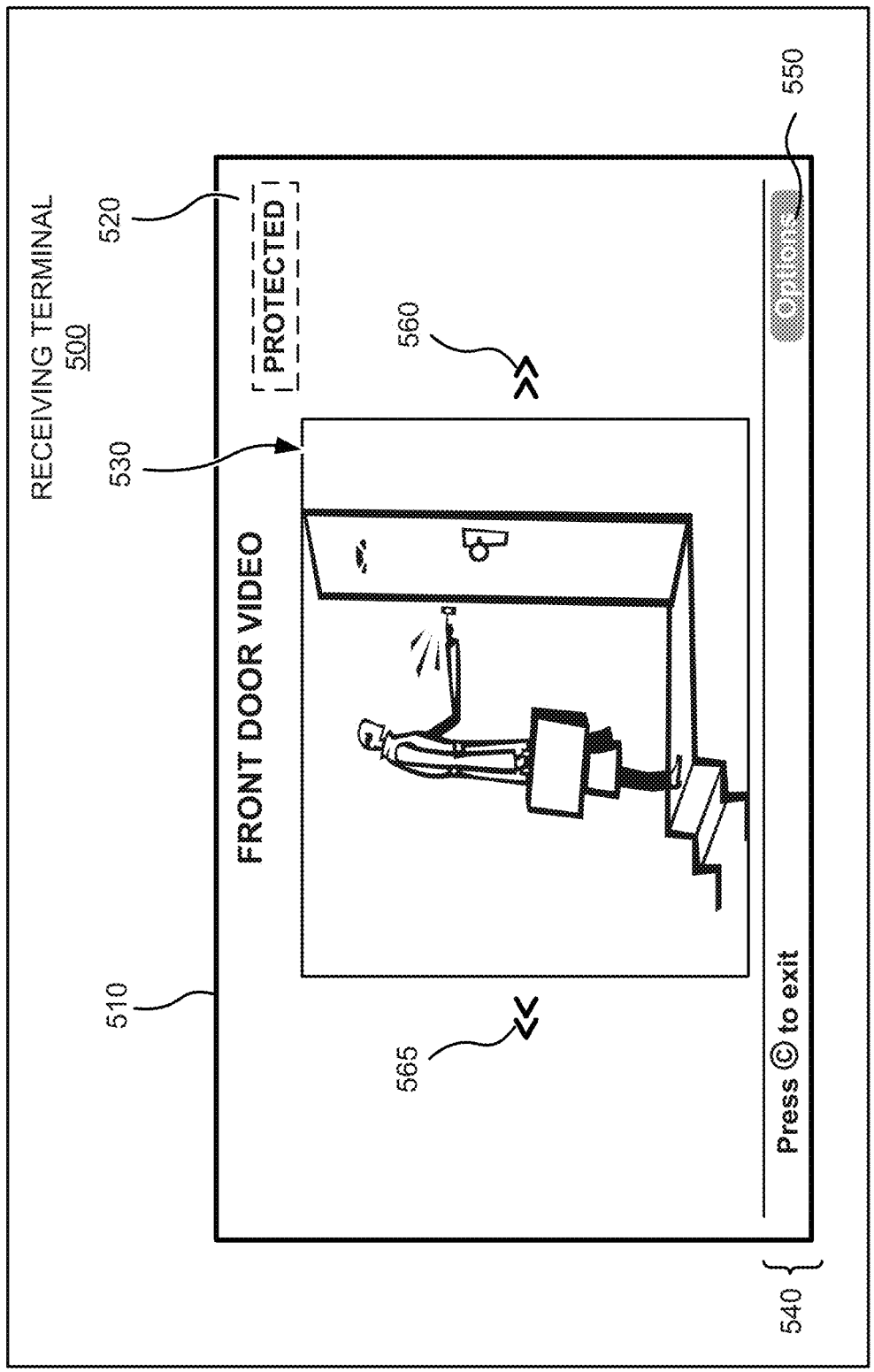
FIG. 5 is an exemplary user interface of a receiving terminal with a security control browser.

FIG. 5 is a functional block diagram of an exemplary receiving terminal 500. In one implementation, the functions described in connection with FIG. 5 may be performed by one or more components of device 200 (FIG. 2). As shown in FIG. 5, receiving terminal 500 may include a display 510 in which a browser 520 may be implemented.

Receiving terminal 500 may be a mobile smart phone, a tablet or a personal computer with mobile data service that may directly (e.g. through webRTC browser/client application etc., running in the devices) or indirectly (e.g. through native audio/video phone capabilities via webRTC gateway functions) terminate webRTC services. Receiving terminal 500 may include audio/video telephony device (including PSTN or IP telephony etc.) or PLMN mobile device (including 3G or LTE etc.) and may terminate the audio/video call with its native telephony or mobile service.

Receiving terminal 500 may include devices or terminals that are components of emergency services system 150 or security management system 160 (associated with members that own/reside in surveillance premises 110, a security and surveillance management company, police/fire/emergency departments, etc.), and which may terminate webRTC audio/video calls initialed by security control device 302 based on triggering events (i.e., unauthorized access). The identifications and preferences of these devices or terminals may be provisioned in security control device 302. Receiving terminal 500 may include a private or public computer that is installed with webRTC enabled browser, and/or a wire line audio/video phones that may directly (e.g. webRTC phones) or indirectly (e.g. Session Initiation Protocol (SIP) Phones via webRTC gateway functions) terminate webRTC services.

Web browser 520 may be provided by web server 130 that allows a receiving device or terminal to be connected to the webRTC call initiated by security control device 302. Web browser 520 may display elements (e.g., keys, icons, buttons, links, etc.), command options, and/or information related to the security of surveillance premises 110. For example, web browser 520 may include an indication 520 that surveillance premises 110 are currently protected. Web browser 520 may allow the user (e.g., of user device 170) to monitor and control security services in surveillance premises 110 via security control device 302.

According to one implementation, web browser 520 may display a security camera view 530 that includes a video feed from a selected camera 320 (not shown in FIG. 5) and a menu bar 540 to select options 550. Options 550 may include, for example, an interface to input instructions for security control device 302. The user may also scroll forward 560 or backward 565 to additional cameras 320 that monitor surveillance premises 110 (e.g., interior cameras 320, back door cameras 320, etc.).

Figure 6A:
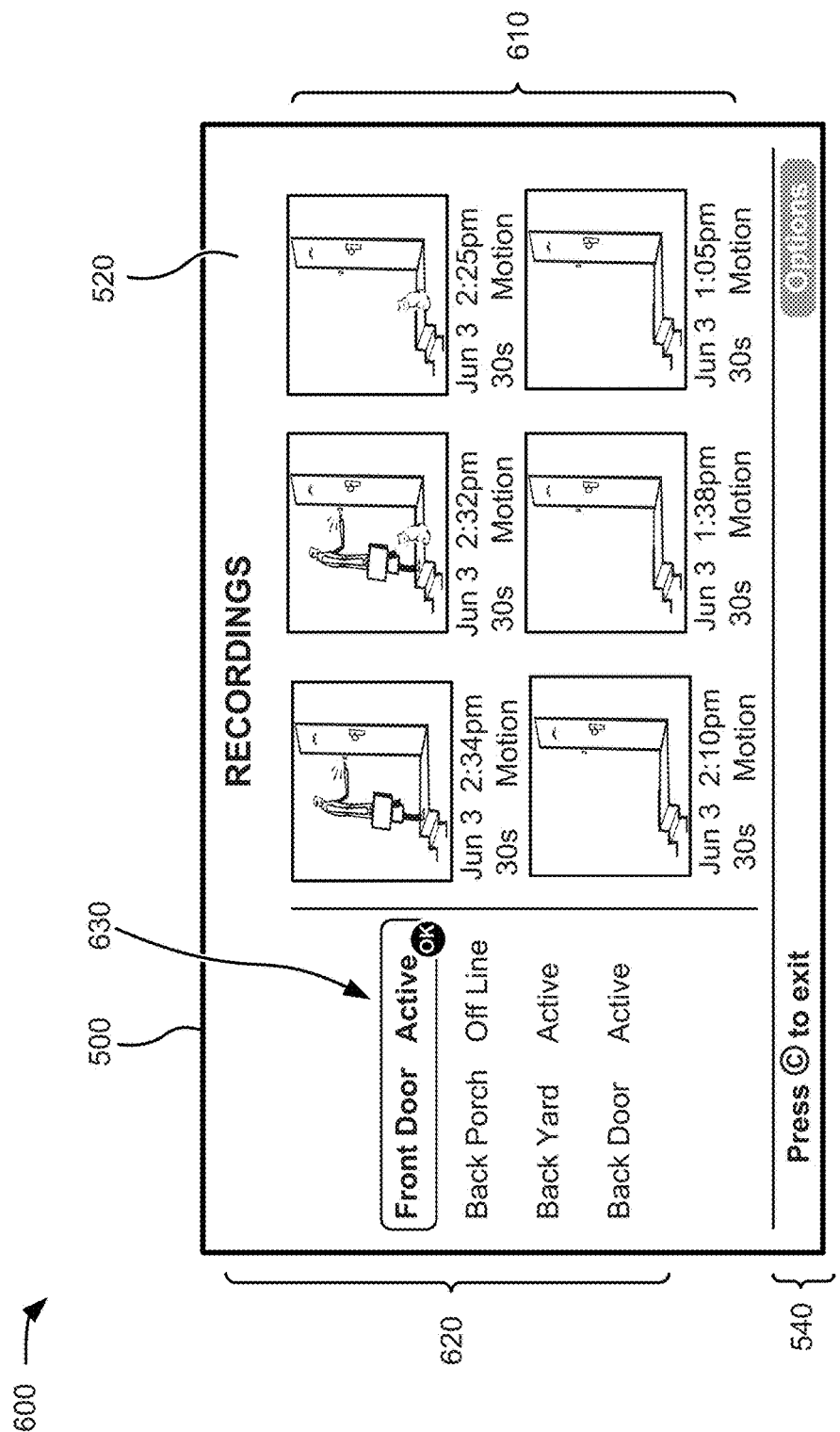
FIGS. 6A-6B provide exemplary user interfaces capable of being generated by the receiving terminal of FIG. 5.
Figure 6B:
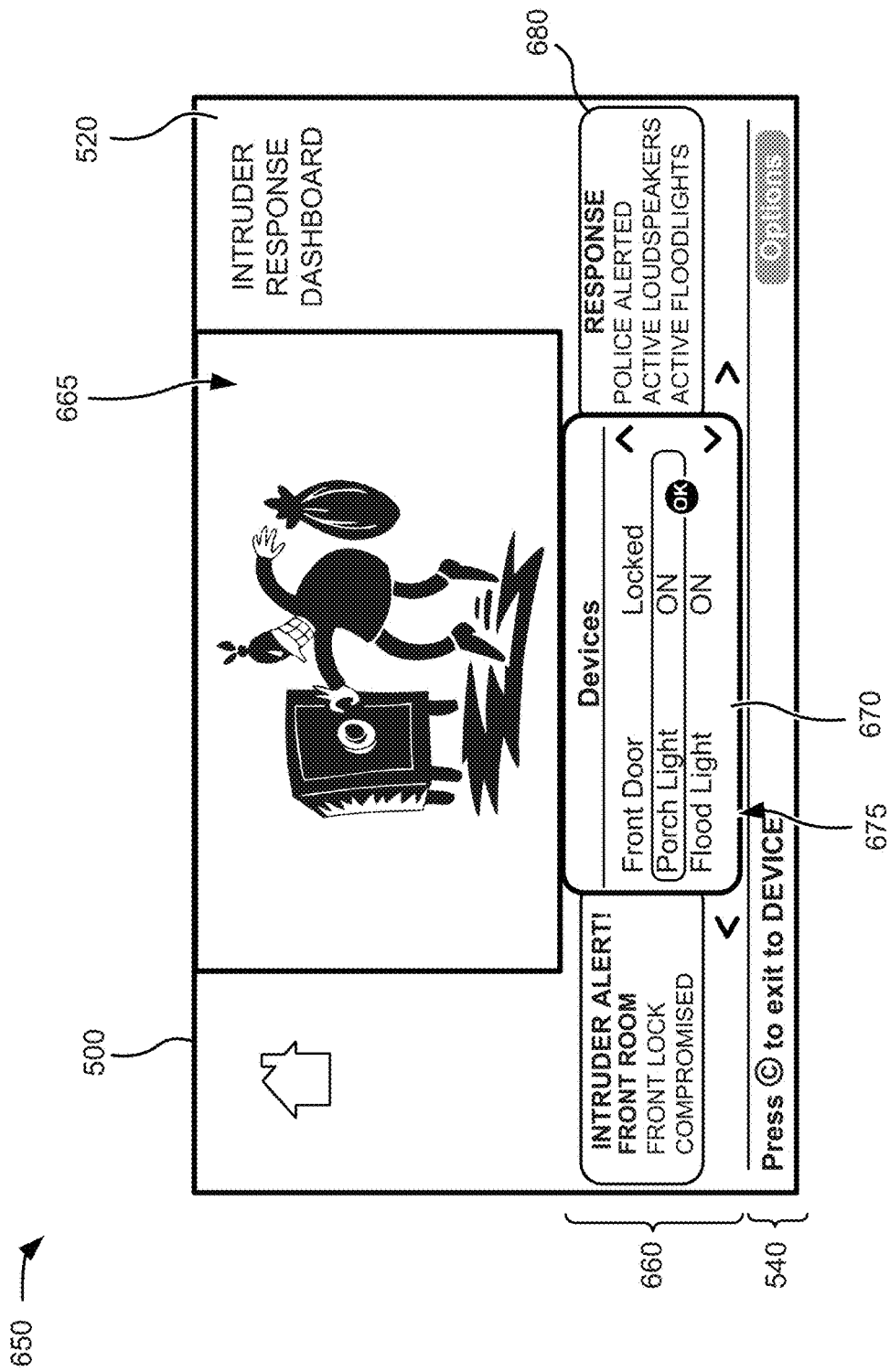

FIGS. 6A-6B provide exemplary user interfaces, respectively 600 and 650, accessible with security control device 302 and a security camera 320.

As shown in FIG. 6A, a user may view recordings 610 of each video feed. The user may also access a menu 620 that corresponds to commands for each camera 320 in surveillance premises 110. For example, menu 620 may include a command 630 that indicates a front door is active (i.e., an associated alarm or security device is armed).

The user may access stored recordings 620 via the web browser. Security control device 302 may include audio/video recording capability that allows capturing recording of video feeds associated with reported events. Recordings 610 may be triggered on-demand by user or authorized members through a webRTC call, or triggered by configuration in security control device 302. The recordings may be stored locally at security control device 302 or at an external database or in association with web server 130. Each recording may have an associated time, camera location, and event detected (e.g., June 3, 2:34 pm motion in FIG. 6A).

Security control device 302 may receive instructions from a user or authorized member to execute other controls to security control system 120 through a webRTC call (e.g., dismiss a reported event, disable/enable surveillance functions in a specific location, view history records, inspect all monitored locations. etc.).

As shown in FIG. 6B, when security control device 302 detects any triggering events, such as scene changes in any locations within surveillance premises 110 under surveillance (e.g. a burglar break-in 665 captured by camera 320), security control device 302 may initiate a webRTC call with audio/video enabled to predetermined devices, such as user device 170.

Web browser 520 may include a notification of an intruder alert 660. Web browser 520 may provide an intruder response dashboard that includes menu 670 of different controls 670 and information for different security support devices 330, such as locks, flood lights, etc. Web browser 520 may also include responses 680 that may be activated in response to the intrusion.

After viewing the real-time situation occurring in surveillance premises 110, the user or authorized members may then provide instructions or initiate control of devices to execute appropriate actions, such as sending a message to police reporting the incident, etc. The user or authorized members may also send audio/video warnings/alerts etc., through the established webRTC call to the reported location's security control device 302 and security support devices 330.

Although the user interfaces in FIGS. 6A and 6B depict a variety of information, in other implementations, the user interfaces may depict less information, additional information, different information, or differently arranged information than depicted in FIGS. 6A and 6B.

Figure 7:
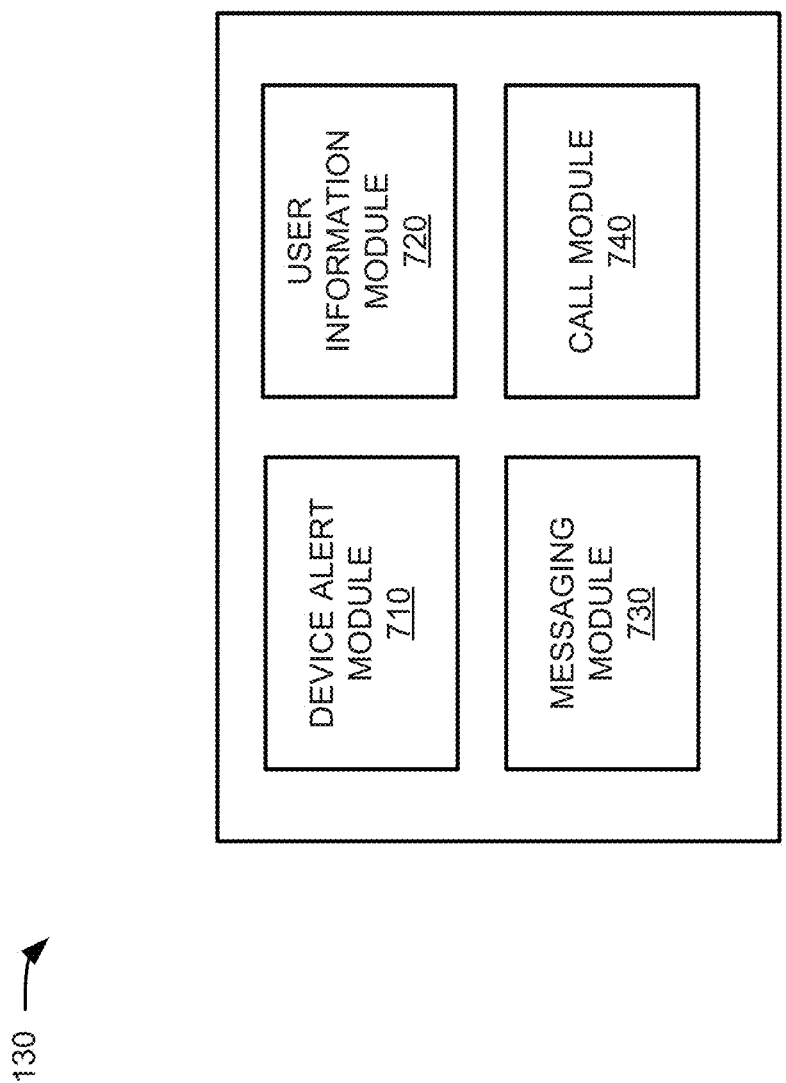
FIG. 7 is a functional block diagram of the web server of FIG. 1.

FIG. 7 is a diagram of exemplary functional components of web server 130. In one implementation, the functions described in connection with FIG. 7 may be performed by one or more components of device 200 (FIG. 2). As shown in FIG. 7, web server 130 may include a device alert module 710, a user information module 720, a messaging module 730, and a call module 740.

Device alert module 710 may receive a webRTC call including an alert from security control device 302 indicating that a triggering event has occurred. Device alert module 710 may determine one or more devices to be alerted, such as user device 170, emergency services system 150 and/or security management system 160, based on predetermined machine-readable instructions. Device alert module 710 may receive a classification for the alert (e.g., an outer perimeter alert indicating that an individual is trespassing on the outside of a building included in surveillance premises 110). Device alert module may work in conjunction with call module 740 to deliver the alert (e.g., webRTC call) to one or more indicated devices, such as user device 170, emergency services system 150 and/or security management system 160, and implement requested call treatment such as multi-party conferencing, etc.

User information module 720 may access a user information database and retrieve the user's surveillance preference configuration parameters. Surveillance preference configuration parameters may include an order and grouping in which devices are to be alerted based on a type of alert.

Messaging module 730 may provide messages including an alert notification to devices indicated by the user's surveillance preference configuration parameters. Messaging module 730 may provide message delivery, protocol conversions, etc., based on the user's surveillance preference configuration parameters and particular devices to which the alert notifications are to be delivered. For example, messaging module 730 may, in association with webRTC gateway 140, provide message delivery interworking/transcoding between webRTC and PSTN/IMS messaging services.

According to one implementation, messaging module 730 may send the alert notification by email, short message, social network messages and/or other types of messaging to the user and any specified members authorized by the user (e.g. family members, friends, designated security management company or police/fire/emergency departments, etc.).

Call module 740 may connect the alert webRTC call received by the device alert module 710 to the user designated devices (such as user device 170, emergency services system 150 and/or security management system 160) and user may receive and terminate the call by using, for example, a webRTC capable browser or a computer instant messaging application or an audio/video call application (such as VoIP) or a webRTC capable mobile browser or mobile application or regular audio/video mobile/wireline phone service.

According to an implementation, call module 740 may also connect the call to his/her designated security management company or police/fire/emergency departments for handling. In case of multi-party call termination, i.e. multiple user devices answer and terminate the call at the same time, call module 740 may provide the associated call treatment such as conferencing. Other call treatment features such as call forwarding, priority calls, etc., may also be provided by the call module 740. Call module 740 may also provide call signaling protocol handling and corresponding conversions, etc., based on the user's surveillance preference configuration parameters and particular devices to which the alert calls are to be delivered. For example, call module 740 may, in association with webRTC gateway 140, provide interworking/transcoding between webRTC calls and PSTN/IMS calls.

Figure 8:
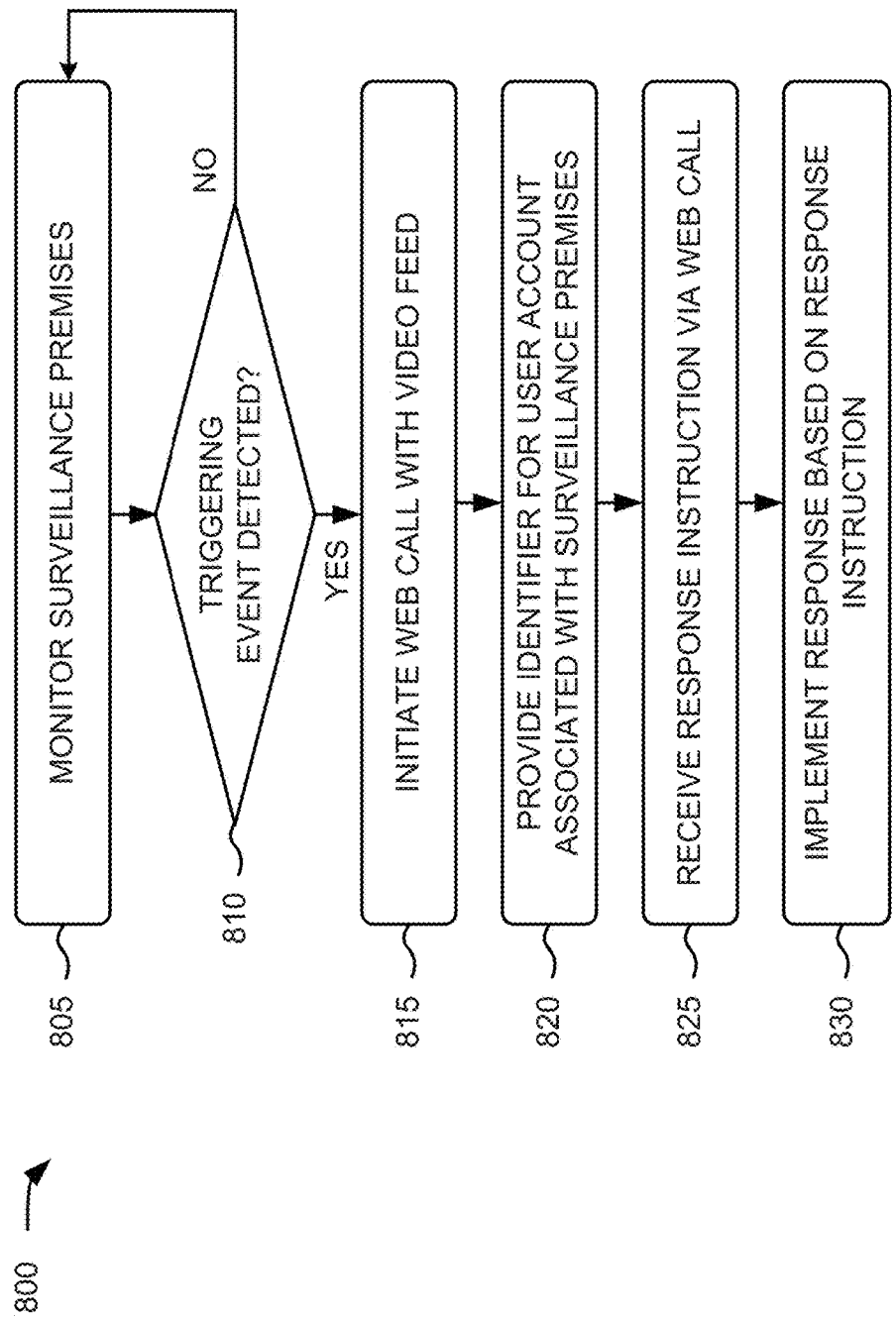
FIG. 8 is a flow chart of an exemplary process for providing security management via a web browser according to implementations described herein.

FIG. 8 is a flow chart of an exemplary process 800 for providing web RTC based monitoring and security services according to implementations described herein. In one implementation, process 800 may be performed by security control device 302. In another implementation, some or all of process 800 may be performed by another device or group of devices, including or excluding security control device 302.

As shown in FIG. 8, process 800 may include monitoring surveillance premises 110 (block 805). For example, in implementations described above in connection with FIG. 3, security control device 302 may monitor surveillance premises 110 based on scene change detection of a video feed from cameras 320 positioned in surveillance premises 110.

Process 800 may further include determining whether a triggering event has been detected (block 810). For example, security control device 302 may determine that a triggering event has been detected when a scene change is detected. Alternatively, security control device 302 may determine that a triggering event has been detected based on a signal from other security support devices 330 or analysis of information from the security support devices 330 (e.g., a loss of power to the security support devices 330).

Process 800 may include initiating a web call with a video feed in response to detecting a triggering event (block 815). For example, security control device 302 may send the web call to web server 130. Security control device 302 may also identify a user account associated with the web call (block 820).

Security control device 302 may receive a response instruction via the web call (block 825). For example, web server 130 may execute a process similar to process 900 described hereinbelow with respect to FIG. 9. The user may receive the web call and provide a response based on the detected event.

At block 830, security control device 302 may implement the instruction received from user device 170 via the web call. For example, security control device 302 may control security support devices to perform further surveillance, security, or deterrence functions (e.g., alarms, locks, floodlights, etc.).

FIG. 9 is a flow chart of another exemplary process 900 for providing web RTC based monitoring and security services according to implementations described herein. In one implementation, process 900 may be performed by web server 130. In another implementation, some or all of process 900 may be performed by another device or group of devices, including or excluding web server 130.

As illustrated in FIG. 9, process 900 may include receiving a web call with a video fee (block 910). For example, web server 130 may receive the web call with the video feed when security control device 302 detects a triggering event at surveillance premises 110.

As further shown in FIG. 9, process 900 may include identifying a user account associated with the web call (block 920). For example, web server 130 may receive a user account identifier from security control device 302.

At block 930, web server 130 may determine a user preference for alerts. For example, web server 130 may search a database that includes user preferences for sending alerts. The preferences may include persons, devices, and online accounts that the user has preselected to receive alerts.

Web server 130 may send an alert including a link to the web call based on user preference for alerts (block 940). For example, web server 130 may provide an alert that includes a link to a web page that includes the video feed. Web server 130 may provide the web page, including the video feed, when the user clicks on the link (block 950). Web server 130 may also deliver the webRTC audio/video call to user devices 170, emergency services system 150 and/or security management system 160 directly.

Systems and/or methods described herein may provide a webRTC based monitor and surveillance system. The systems and/or methods may be implemented to provide private home security and surveillance.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 8 and 9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer implemented method, comprising:
monitoring, by a controlling device installed at a surveillance premises, a video feed of the surveillance premises in association with a user account;
detecting a triggering event, by the controlling device, based on the video feed;
sending, by the controlling device and via a web server, an alert that includes a web link for a web page to a user device associated with the user account, for the user device to receive a web real-time communication (webRTC) call from the controlling device;
initiating, by the controlling device, the webRTC call to the user device;
establishing, by the controlling device, the webRTC call with the user device when the user device accesses the web link provided by the alert;
providing, by the controlling device, the video feed to the user device over the webRTC call; and
receiving an instruction, at the controlling device from the user device, over the webRTC call to control security support devices.

2. The computer implemented method of claim 1, wherein the security support devices include at least one of an alarm, a light device, a camera, a video device or an audio device.

3. The computer implemented method of claim 1, wherein the instruction commands the controlling device to dismiss the detected triggering event.

4. The computer implemented method of claim 1, wherein detecting the triggering event in the surveillance premises further comprises:
performing a scene change detection on the video feed.

5. The computer implemented method of claim 1, wherein monitoring the video feed further comprises:
monitoring a sampled video feed including video feeds corresponding to multiple video cameras.

6. The computer implemented method of claim 1, wherein detecting the triggering event further comprises:
receiving a signal from a motion detector.

7. The computer implemented method of claim 1, wherein the controlling device performs the monitoring in accordance with user inputs that specify a surveillance schedule and different surveillance zones in the surveillance premises.

8. The computer implemented method of claim 1, wherein establishing the webRTC call with the user device includes establishing the webRTC call with the user device over a network that includes an IMS.

9. A computer implemented method, comprising:
receiving, from a controlling device installed at a surveillance premises a web real time communication (webRTC) call that includes a video feed of the surveillance premises in response to the controlling device detecting a triggering event;
sending a web link for a web page to a user device associated with a user account associated with the surveillance premises;
providing access, through the web page to the user device, the webRTC call from the controlling device; and
establishing the webRTC call from the controlling device to the user device when the user device accesses the web page via the web link, wherein the webRTC call provides the video feed to the user device and an instruction, to the controlling device from the user device, to control security support devices.

10. The computer implemented method of claim 9, further comprising:
providing one or more of a service, feature or application based on a webRTC signaling gateway.

11. The computer implemented method of claim 10, wherein providing the one or more of a service, feature or application based on the webRTC signaling gateway further comprises:
providing interworking with a public land mobile network.

12. The computer implemented method of claim 9, wherein providing an access through the web page further comprises:
providing the web page to the user device with at least one preference and an identity that is provisioned in the controlling device.

13. The computer implemented method of claim 9, further comprising:
providing another web page to a second device associated with at least one of a police department, a fire department, an emergency service provider, or a security management company, wherein the other web page permits access to the controlling device.

14. The computer implemented method of claim 9, further comprising:
providing a password protected web page that includes a short event description associated with the detected triggering event, and a recommended action in response to the detected triggering event.

15. The computer implemented method of claim 9, further comprising:
sending at least one of an email, a short message, a social network message, or an online application based message to at least one recipient indicated by a user preference associated with the user account.

16. The computer implemented method of claim 9, wherein establishing the webRTC call includes establishing the webRTC call from the controlling device to the user device over a network that includes an IMS.

17. A system, comprising:
a set-top box configured to:
monitor, at a surveillance premises, a video feed of the surveillance premises in association with a user account;
detect a triggering event based on the video feed;
send via a web server an alert that includes a web link for a web page to a user device associated with the user account associated with the surveillance premises, for the user device to receive a web real-time communication (webRTC) call from the set-top box;
initiate the webRTC call to the user device via the web server;
establish the webRTC call with the user device when the user device accesses the web link provided by the alert; and
provide the video feed to the user device over the webRTC call; and
the web server configured to:
receive, from the set-top box installed at the surveillance premises, the webRTC call;
forward the alert to the user device;
provide access, through the web page, to the user device, to the webRTC call from the set-top box; and
establish the webRTC call from the set-top box to the user device when the user device accesses the web page, wherein the webRTC call provides the video feed to the user device and an instruction, to the controlling device from the user device, to control security support devices.

18. The system of claim 17, further comprising:
redundant power sources associated with the set-top box; and
at least one power sensor that is to indicate to the user device that the set-top box is not currently receiving power.

19. The system of claim 17, wherein the set-top box is further to:
receive input that designates at least one particular type of surveillance for a portion of the surveillance premises.

20. The system of claim 17, wherein the set-top box is further to:
identify individuals associated with the surveillance premises location based on facial recognition technology.

21. A web server, comprising:
a memory to store instructions;
a processor to execute the instructions to:
receive, from a controlling device installed at a surveillance premises a web real time communication (webRTC) call that includes a video feed of the surveillance premises in response to the controlling device detecting a triggering event;

send a web link for a web page to a user device associated with a user account associated with the surveillance premises;

provide access, through the web page to the user device, to the webRTC call from the controlling device; and establish the webRTC call from the controlling device to the user device when the user device accesses the web page via the web link, wherein the webRTC call provides the video feed to the user device and an instruction, to the controlling device from the user device, to control security support devices.

* * * * *